F. C. RISDON.
TIMBER FELLING MECHANISM.
APPLICATION FILED AUG. 19, 1915.

1,198,580.

Patented Sept. 19, 1916.

WITNESSES:
N. R. Tyndall
E. P. Wall

INVENTOR.
F. C. Risdon
By J. Edward Maybee
ATTY.

UNITED STATES PATENT OFFICE.

FRANK COLFAX RISDON, OF NELSON, BRITISH COLUMBIA, CANADA.

TIMBER-FELLING MECHANISM.

1,198,580. Specification of Letters Patent. Patented Sept. 19, 1916.

Application filed August 19, 1915. Serial No. 46,387.

*To all whom it may concern:*

Be it known that I, FRANK COLFAX RISDON, of the city of Nelson, county of Kootenay, Province of British Columbia, Canada, a subject of the King of Great Britain, have invented certain new and useful Improvements in Timber-Felling Mechanism, of which the following is a specification.

This invention relates to apparatus for cutting down standing timber, and my object is to devise simple, easily applied and easily operated mechanism for guiding and supporting a cross cut saw in proper relation to a tree so that one man can use the saw in felling the tree.

I attain my object by means of constructions which may be briefly described as follows. A spindle is provided at each end with a dog whereby it may be secured in proper position on a tree. A saw carrier is provided with means for securing a saw thereto and is slidable on a guide which is journaled on said spindle. A sleeve is also journaled on the spindle which may be locked to the saw carriage guide in a number of different positions. An arm connected to said sleeve is provided with a resilient controlling device which tends to swing the saw carriage guide to move the saw out of action. A springy cut is thus given the saw, which is particularly advantageous.

The invention is hereinafter more particularly described and is illustrated in the accompanying drawings in which—

Figure 1:
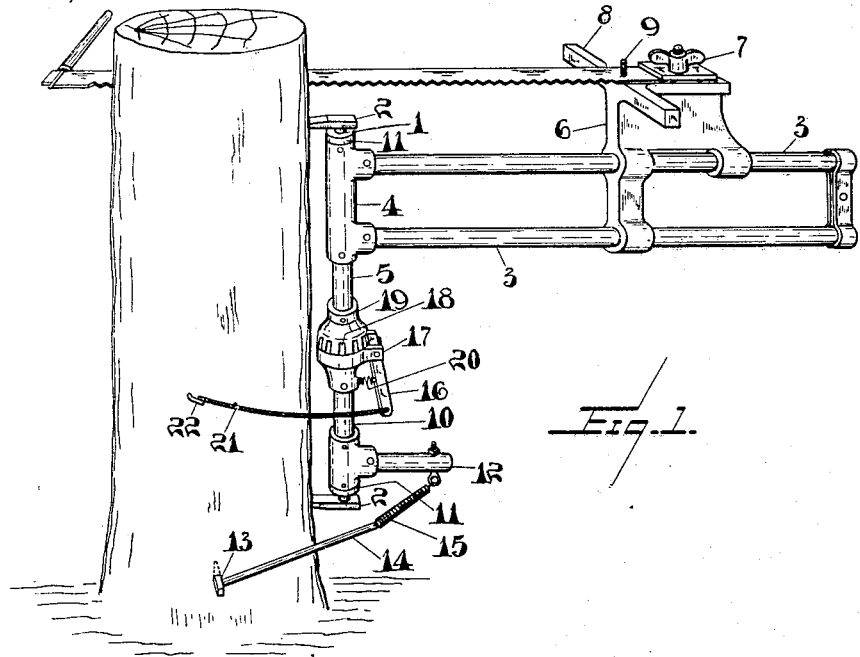
Figure 2:
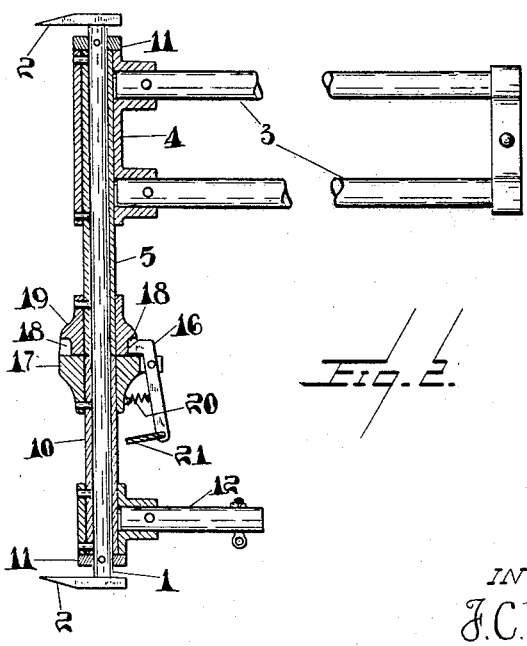

Figure 1 is a perspective view of the apparatus, and Fig. 2 a longitudinal section of the same partly broken away.

In the drawings like numerals of reference indicate corresponding parts in the different figures.

1 is a spindle provided at each end with a dog 2 adapted to be driven into a tree trunk as shown to support the apparatus in operative position. On this spindle is journaled a saw carriage guide comprising one or more guide bars 3 secured to the sleeve 4, which itself is sleeved on and secured to the tube 5 journaled on the spindle 1.

6 is the saw carriage adapted as shown to slide on the guide bars 3, which are preferably two in number, though in some cases the lower guide bar may be omitted. This carriage is provided with the screw clamp 7 adapted to engage the end of the blade of a cross cut saw as shown. A cross bar 8 is preferably formed on the carriage to support the saw blade, and from this projects a pin 9 adapted to project through the hole usually formed in the end of a saw blade. The saw may thus be rigidly or loosely secured to the saw carriage as may be desired.

Below the tube 5 a sleeve 10 is journaled on the spindle 1. Collars 11 pinned to the spindle serve to hold the tube and sleeve in proper relationship. This tube has suitably secured thereto an arm 12. To this arm is secured a controlling device comprising the dog 13 formed on or secured to the end of the arm 14, which by means of the coil spring 15 is connected with the end of the arm 12. The dog is driven into the tree trunk and the device therefore, when the sleeve 10 is locked to the tube 5, causes the saw carriage guide to move the saw out of action.

The sleeve 10 is locked to the tube 5 by means of the pivoted catch 16, which is pivoted on a collar 17 secured to the sleeve 10 and which is adapted to engage in any one of a series of notches 18 formed in a collar 19 secured to the tube 5. A coil spring 20, arranged as shown, tends to move the dog to its notch engaging position. A cord 21 is connected to the catch 16 and is preferably provided at its outer end with a hook 22 which may be engaged in the bark of the tree in a position convenient to the hand of the sawyer.

The operation of the device is as follows. The spindle having been connected with the tree as already described and the saw connected to the carriage, the dog 13 is driven into the lower part of the tree trunk so that the coil spring 15 is slightly under tension when the saw is touching the tree. Care is taken that the cutting edge is engaged with the tree so that the saw is exactly parallel with the guide bars 3. The saw is now operated until a substantial cut has been made. It will then be found that the saw is getting out of alinement with the guide bars. The catch 16 is then released and the guide bars swung until they are again parallel to the saw, when the catch is again engaged. This process is repeated until the tree is completely cut through. It will be found that the guide bars will have to swing through about one-quarter of a revolution to complete the felling of an ordinary sized tree.

The spring 15 and the controlling device is of importance, as a springiness is thus given to the cut of the saw, which materially eases the operation.

What I claim as my invention is:—

1. In timber felling mechanism, the combination of a spindle; dogs whereby the spindle may be secured to a tree; a saw carriage guide adapted to swing on said spindle; a saw carriage slidable on said guide; means on said carriage for securing one end of a cross cut saw thereto; and controlling means connected with the spindle and including a resilient part tending to swing the saw carriage guide to move the saw out of action.

2. In timber felling mechanism, the combination of a spindle; dogs whereby the spindle may be secured to a tree; a saw carriage guide adapted to swing on said spindle; a saw carriage slidable on said guide; means on said carriage for securing one end of a cross cut saw thereto; controlling means including a resilient part tending to swing the saw carriage guide to move the saw out of action; and means for rotarily adjusting the saw carriage guide to any one of a plurality of positions relative to the controlling means.

3. In timber felling mechanism, the combination of a spindle; dogs whereby the spindle may be secured to a tree; a saw carriage guide adapted to swing on said spindle; a saw carriage slidable on said guide; means on said carriage for securing one end of a cross cut saw thereto; a sleeve journaled on the spindle; means for connecting the sleeve and the saw carriage guide together in any one of a plurality of positions to vary the direction of the said guide; and means for holding the sleeve from rotary movement including a resilient part.

4. In timber felling mechanism, the combination of a spindle; dogs whereby the spindle may be secured to a tree; a saw carriage guide adapted to swing on said spindle; a saw carriage slidable on said guide; means on said carriage for securing one end of a cross cut saw thereto; a sleeve journaled on the spindle; means for connecting the sleeve and the saw carriage guide together in any one of a plurality of positions to vary the direction of the said guide; an arm connected to said sleeve; a dog for engagement with the tree; and a connection between the dog and the arm including a coil spring.

Signed at Nelson, British Columbia, this 7th day of August 1915, in the presence of the two undersigned witnesses.

FRANK COLFAX RISDON.

Witnesses:
CATHERINE L. WHITMORE,
ERIC P. DAWSON.

Copies of this patent may be obtained for five cents each, by addressing the "Commissioner of Patents, Washington, D. C."